United States Patent [19]

Bishop et al.

[11] Patent Number: 4,875,135
[45] Date of Patent: Oct. 17, 1989

[54] PRESSURE SENSOR

[75] Inventors: Robert P. Bishop, Carver, Mass.; Anthony J. Sabetti, Greenville, R.I.; Thomas Charboneau, Plainville, Mass.

[73] Assignee: Texas Instruments Incorporated, Dallas, Tex.

[21] Appl. No.: 278,877

[22] Filed: Dec. 2, 1988

[51] Int. Cl.$^4$ .............................................. H01G 7/00
[52] U.S. Cl. ...................................... 361/283; 73/718
[58] Field of Search ................... 73/718, 724; 361/283

[56] References Cited

U.S. PATENT DOCUMENTS

| 4,128,006 | 12/1978 | Grabow | 73/724 |
|---|---|---|---|
| 4,288,835 | 9/1981 | Lee et al. | 361/283 |
| 4,329,732 | 5/1982 | Kavli et al. | 361/283 |
| 4,716,492 | 12/1987 | Charboneau et al. | 361/283 |

Primary Examiner—Donald A. Griffin
Attorney, Agent, or Firm—James P. McAndrews; John A. Haug; Melvin Sharp

[57] ABSTRACT

A pressure sensor has a pressure responsive capacitor electrically connected to a signal conditioning circuit which is calibrated after mounting in a housing to provide an electrical signal corresponding to an applied pressure. The capacitor has thin metal capacitor plates on facing surfaces of a ceramic diaphragm and base and is adapted to receive an applied pressure on the diaphragm. Terminals from the capacitor are disposed on an opposite surface of the capacitor base; the circuit has a flexible substrate having a first end overlying the opposite base surface mounting circuit components electrically connected to the capacitor terminals and has an opposite end folded over the first end electrically connected to connector terminals on a connector body overlying the base; and the housing includes a metal sleeve fitted over the capacitor and body having a rim clamping the capacitor and connector body together to form the sensor. The connector body has a tubular portion open at both ends accessible from outside the body and extending to the flexible circuit to permit circuit calibration through the tubular portion and has an encapsulant therein sealing the body after calibration. Circuit pads capacitively coupled to ground connections at each end of the flexible circuit substrate are provided on substrate tabs which extend between the body and housing rim to be clamped in electrical engagement to each other and to the housing to provide improved electromagnetic compatibility for the sensor.

8 Claims, 4 Drawing Sheets

PRESSURE SENSOR

BACKGROUND OF THE INVENTION

The field of the invention is that of pressure sensors having capacitive pressure transducers and the invention relates more particularly to a pressure sensor having a pressure responsive capacitive pressure transducer mounted on a housing with a signal conditioning electrical circuit which is calibratable relative to the transducer after mounting on the housing.

A known pressure sensor as shown in U.S. Pat. No. 4,716,492 comprises a capacitive pressure transducer having a thin ceramic diaphragm mounted in closely spaced, sealed, overlying relation to a ceramic base, and having metal coatings deposited on respective opposing surfaces of the diaphragm and base to serve as capacitor plates arranged in predetermined closely spaced relation to each other to form a capacitor. Transducer terminals connected to the capacitor plates are arranged at an opposite surface of the transducer base and a signal conditioning electrical circuit connected to the transducer terminals is mounted on the transducer. A cup-shaped connector body of electrical insulating material is fitted over the electrical circuit and is secured to the transducer by a metal housing sleeve which has a port for exposing the transducer diaphragm to an applied pressure and which has a rim deformed against the connector body. In that arrangement, the diaphragm is movable in response to variation in pressure applied to the diaphragm to vary the capacitance of the capacitor in accordance with the changes in applied pressure and the electrical circuit provides an electrical output signal corresponding to the applied pressure. The electrical circuit is calibratable relative to the capacitive pressure transducer after mounting in the sensor housing so that the sensor is adapted for wide application to be suitable for low cost high volume manufacture. It is somewhat difficult to assemble the sensor in an economical manner, to properly calibrate the sensor and seal it after calibration, and to assure that the sensor is compatible with use in automotive environments and the like where there is substantial electromagnetic interference.

SUMMARY OF THE INVENTION

It is an object of this invention to provide a novel and improved pressure sensor; to provide such a sensor having an improved capacitive pressure transducer; to provide such a sensor having a structure which is adapted for more economical and reliable manufacture at low cost; to provide such a pressure sensor having a capacitive pressure transducer and a signal conditioning circuit mounting in a common housing to be calibrated relative to each other in a convenient manner after mounting in the housing; to provide such a sensor which is easily sealed after such calibration; and to provide such a sensor having improved electromagnetic compatibility for use in automotive environments and the like.

Briefly described, the novel and improved pressure sensor of the invention comprises a capacitive pressure transducer having one surface to be exposed to an applied pressure to provide a capacitance which varies with the applied pressure. Transducer terminals are disposed on an opposite surface of the transducer. A connector body preferably formed of electrical insulating material has connector terminals mounting on the body and a metal housing secures the connector body in overlying relation to an opposite surface of the transducer to form a chamber therebetween. An electrical circuit is disposed in the chamber electrically connected to the transducer and connector terminals for providing an electrical signal corresponding to the applied pressure. Preferably the connector body is cup-shaped having a bottom, a side wall and a rim and has the rim disposed in facing relation to the opposite transducer surface to form the chamber, the connector terminals extending from the chamber through the bottom of the body exteriorly of the chamber. Preferably the housing has a metal sleeve receiving the transducer and at least a portion of the connector body therein, has a port for exposing the one transducer surface to an applied pressure, and has a rim of the sleeve deformed over the connector body clamping the rim of the connector body against the opposite surface of the capacitive transducer. The circuit is preferably adapted to be calibrated relative to the transducer after mounting in the housing.

In accordance with this invention, the electrical circuit preferably includes a flexible substrate having one end portion which is disposed in overlying relation to the opposite surface of the transducer mounting electrical circuit components in electrically connected relation to the transducer terminals and has an opposite end portion folded over said one end portion mounting circuit paths thereon electrically connected to the connectors terminals. Preferably the electrical circuit has circuit paths forming electrical ground connections for the circuit and has those ground connection circuit paths capacitively coupled to the metal housing of the sensor for providing the sensor with improved electromagnetic compatibility. Preferably the flexible substrate has an integral tab extending therefrom, has a circuit pad formed on the tab, and has a capacitor connected between the circuit pad and a ground connection circuit path of the circuit, the tab extending between the connector body and the metal housing sleeve so that the circuit pad is clamped in electrically connected engagement with the housing for capacitively coupling the ground connection circuit path of the circuit to the housing. Preferably the flexible substrate has a tab extending from each end portion of the substrate, has a circuit pad on each tab, has capacitors connected between the respective circuit paths and ground connection circuit paths in the circuit, has the end portions of the flexible substrate folded so that the circuit paths extend between the connector body and the transducer in overlying relation to each to be clamped in electrically connected relation to each therebetween and has at least one tab extending between the connector body and the metal housing sleeve clamped in electrically connected engagement with the housing for providing capacitive coupling of the ground connections of the electrical circuit on each end portion of the substrate to the housing.

Preferably where the electrical circuit is adapted to be calibrated after mounting on the housing, the connector body has an integral tubular portion open at one end outside the housing and extending into the chamber to disposed its opposite end adjacent a calibrating portion of the electrical circuit on the flexible substrate for permitting access to that calibrating portion of the circuit for calibrating the sensor. An encapsulant is introduced into the tubular portion of the connector body for sealing the chamber, the tubular portion restricting the encapsulant to the calibrating portion of the circuit for assuring proper operation of other portions of the circuit.

DESCRIPTION OF THE DRAWINGS

Other objects, advantages and details of the novel and improved pressure sensor of this invention appear in the following detailed description of preferred embodiments of the invention, the detailed description referring to the drawings in which.

DESCRIPTION OF THE PREFERRED EMBODIMENTS

Figure 1:
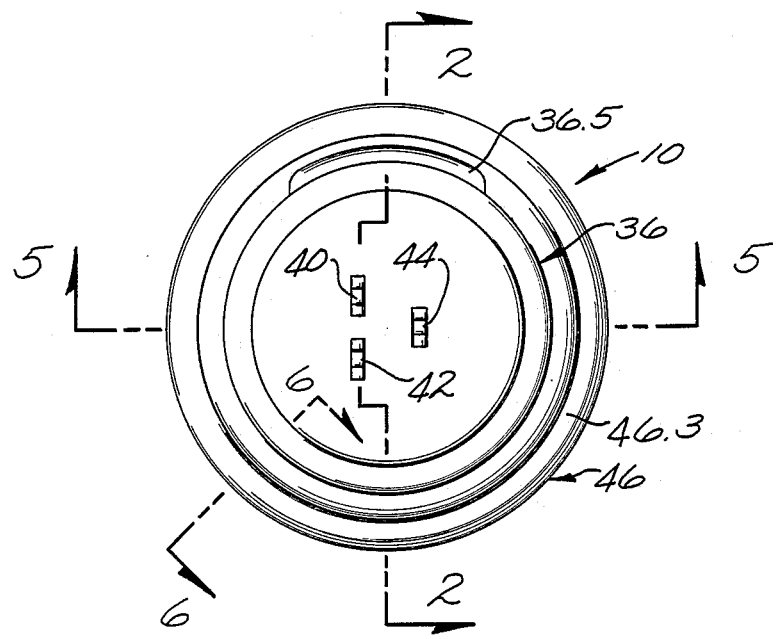
FIG. 1 is a plan view of the sensor of the invention.

Referring to the drawings, 10 in FIGS. 1-2 and 5-6 indicates the novel pressure sensor of the invention which includes a pressure responsive capacitive pressure transducer 12 preferably of a flat disc shape as shown having one surface 12.1 to be exposed to an applied fluid pressure or the like and having an opposite surface 12.2 having transducer terminals disposed thereon. Preferably the transducer comprises a thin diaphragm 14 of a ceramic material such as alumina or the like mounted in closely spaced, sealed, overlying relation to a ceramic base 16 of a similar material by a glass sealant 18 or the like (see FIG. 7) to be movable relative to the base in response to changes in the applied pressure. Metal coatings 20 and 22 are provided on opposing surfaces 14.1, 16.1 of the diaphragm and base to serve as capacitor plates arranged in closely spaced relation to form a capacitor having a capacitance which varies with the applied pressure. Terminals 24, 26 extend from the capacitor plates in sealed relation through the ceramic base to be disposed on the opposite surfaces of the transducer. As thus described, the structure of the transducer is known as referenced in the above-noted U.S. patent. The coatings have a very thin and uniform thickness so that the spacing t between the metal coatings is very precisely predetermined. If desired, a metal guard ring 16.2 surrounds the capacitor plate 16.1 and is provided with a corresponding terminal 34.

In accordance with the invention, the sensor further includes a connector body 36 of an electrical insulating material such as a glass reinforced modified polyethylene teraphthalate which is disposed in overlying relation to the opposite surface 12.2 of the transducer to form a chamber 38 therebetween. Preferably the connector body is cup-shaped having a bottom 36.1, a side wall 36.2, a rim 36.3 and a flange 36.4 extending around the rim, and has a plurality of connector terminals 40, 42, 44 extending from the chamber, preferably through the bottom of the body, to a location exteriorly of the sensor. The connector body is disposed with the rim 36.1 in facing relation to the opposite surface 12.2 of the transducer for forming the chamber 38. A housing 46 has a port 46.1 for exposing the transducer surface 12.1 to an applied pressure, has a sealing o-ring 48 or the like arranged between the transducer surface 12.1 and the port, and has a metal sleeve 46.2 receiving the transducer and at least part of the connector body therein, the sleeve having a rim portion 46.3 deformed by swaging or the like over at least part of the connector body such as the flange 36.4 for clamping the connector body and transducer together to form the chamber 38.

Figure 2:
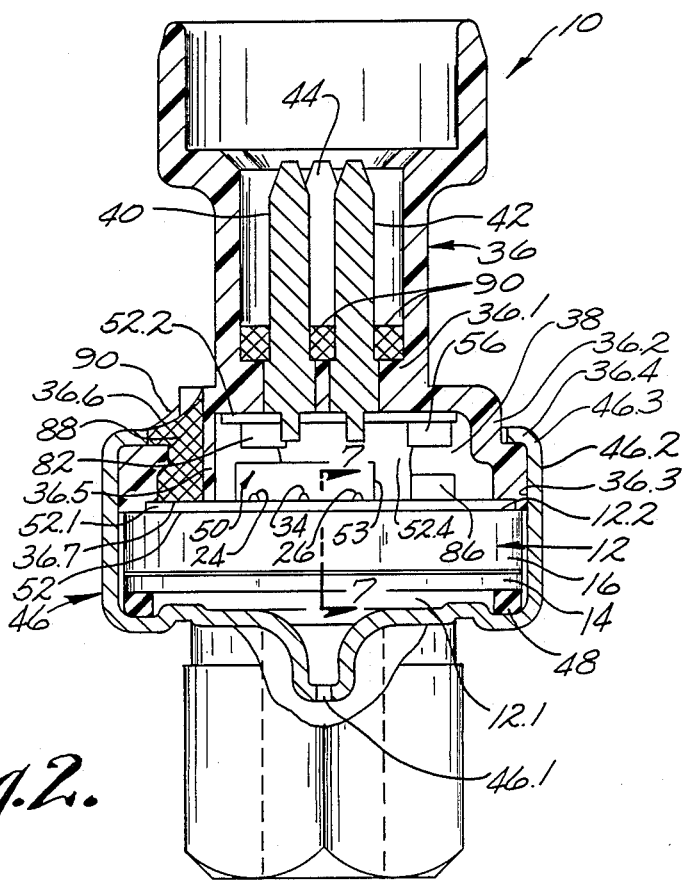
FIG. 2 is a section view along line 2—2 of FIG. 1.
Figure 5:
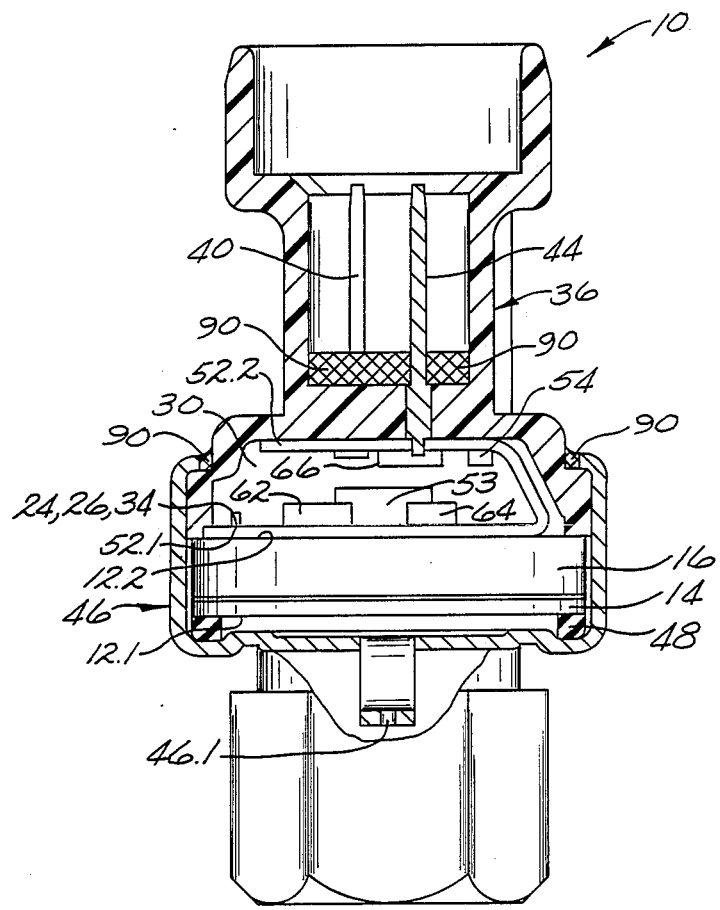
FIG. 5 is a section view similar to FIG. 2 along line 5—5 of FIG. 1.

The sensor 10 further includes an electrical circuit disposed in chamber 38 as indicated generally at 50 in FIGS. 2-6 electrically connected to the transducer and connector terminals for providing an electrical signal corresponding to the pressure applied to the capacitive transducer. Preferably the circuit is adapted to be calibrated relative to the transducer after mounting in the housing 46. As such an electrical circuit is known as referenced in the above-noted U.S. patent, all details of the circuit are not described herein and it will be understood that the circuit includes circuit components such as an integrated circuit unit, resistors and capacitors or the like. In accordance with this invention, the electrical circuit 50 further includes a flexible substrate 52 of a strong, pliable, temperature resistant, electrically insulating material such as the polyimide material sold under the trademark Kapton. One end portion 52.1 of the flexible substrate is disposed in overlying relation to the opposite surface 12.2 of the transducer mounting electrical circuit components in electrically connected relation to each other and to the transducer terminals, and an opposite end portion 52.2 of the flexible substrate is folded over the first portion 52.1 as shown in FIGS. 2 and 5 to underly the bottom of the connector body within the chamber 38, that opposite end portion having circuit paths formed thereon electrically connected to the connector terminals. If desired, the opposite end portion of the flexible substrate also mounts circuit components thereon.

Figure 3:
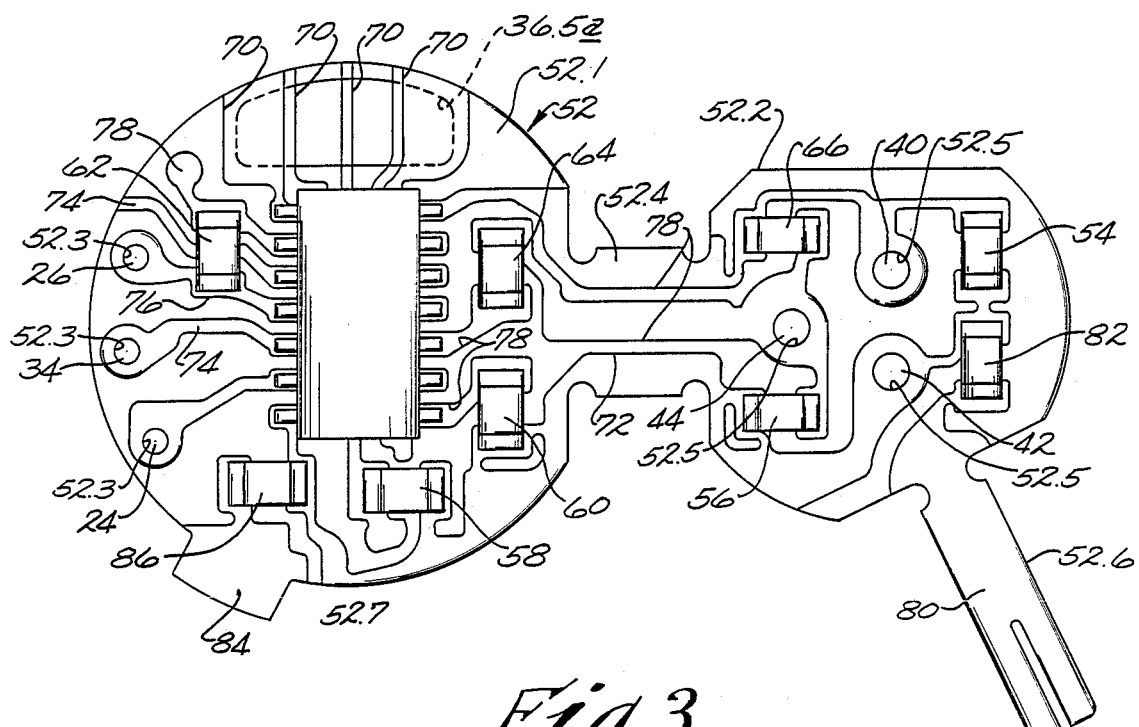
FIG. 3 is an enlarged plan view of the flexible circuit substrate used in the sensor of FIG. 1.
Figure 4:
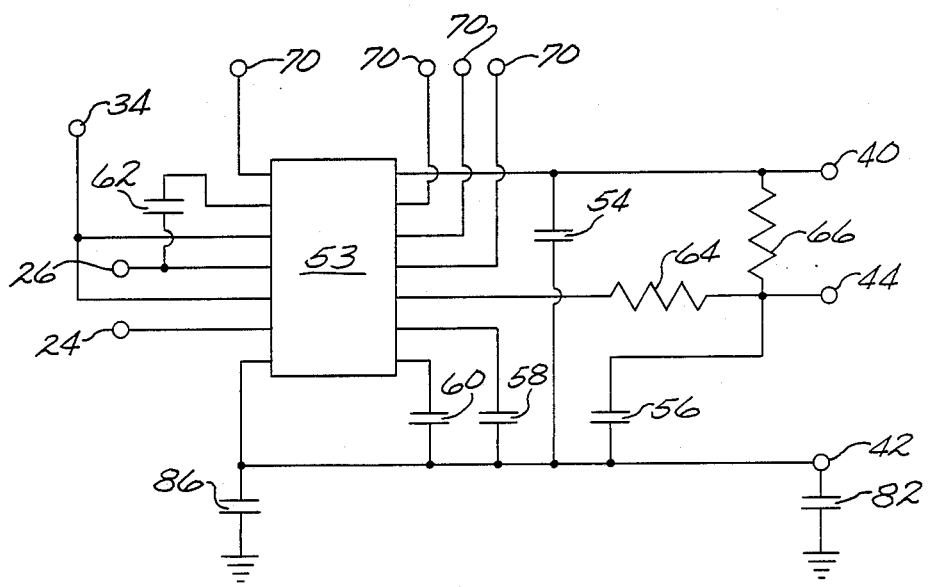
FIG. 4 is a schematic view of the circuit shown in FIG. 3.

Preferably for example, as shown particularly in FIG. 3, the flexible substrate has an integrated circuit unit 53 mounted on the end portion 52.1 of the substrate with capacitors 58, 60, 62 and 86 with a resistor 64, and has openings 52.3 in the flexible substrate fitted over respective transducer terminals 24, 26 and 34. The opposite end 52.2 of the flexible substrate is connected to the first portion 52.1 by an intermediate, easily pliable, hinge portion 52.4 of reduced width, has capacitors 54, 56 and 82 and resistor 66 mounted thereon, and has openings 52.5 fitted over respective connector terminals 40, 42 and 44. Circuit paths are deposited on the flexible substrate for electrically connecting the circuit components to each other and to the transducer and connector terminals in a desired manner. In that arrangement, connector terminal 40 serves to connect the sensor to a +5 VDC supply, connector terminal 42 provides a ground connection for the sensor, and connector terminal 44 provides a signal output for the sensor corresponding to the applied pressure; transducer terminal 24 provides power input to the transducer, transducer terminal 26 provides a pressure detecting signal from the transducer to the integrated circuit unit, and transducer terminal 34 is connected to a guard ring 16.2 in the transducer; circuit path pads 70 permit input to the integrated circuit unit for calibrating the electrical circuit 50 relative to the transducer 12 in a known manner; circuit path 72 provides ground connections for the electrical circuit 50; circuit path 74 connected to the guard ring 16.2 extends around the detector terminal circuit path 76 for electromagnetically shielding the detector signal; and other circuit paths 78 electrically connect the circuit components to each other and to the terminals for providing the circuit connections as indicated schematically in FIG. 3.

Figure 6:
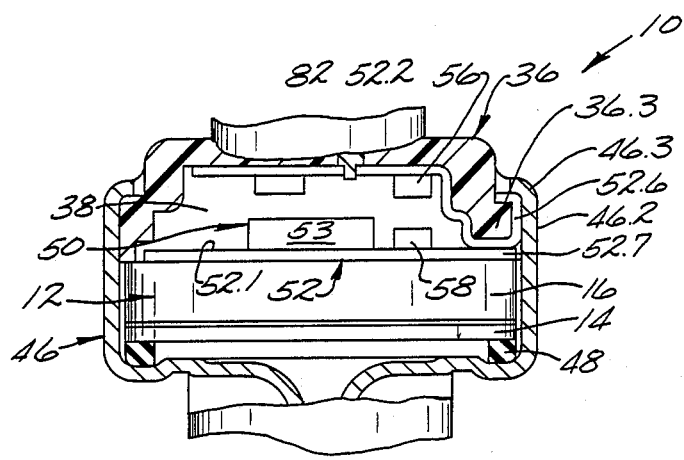
FIG. 6 is a partial section view along line 6—6 of FIG. 1.
Figure 7:
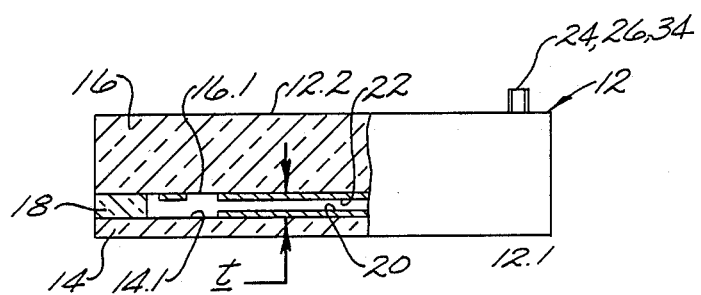
FIG. 7 is a partial section view to enlarged scale along line 7—7 FIG. 2.

In accordance with the invention, the circuit path portions in the electrical circuit 50 forming electrical ground connections for the circuit are preferably capacitively coupled to the metal housing 46 of the sensor for providing the sensor with improved electromagnetic compatibility for use in an automotive environment where the sensor is exposed to substantial electromagnetic interference. Preferably for example, an integral tab portion 52.6 of the flexible substrate extends from the end portion 52.2 of the flexible substrate and has a circuit pad 80 formed thereon. A capacitor 82 is mounted on the flexible substrate electrically connected between the circuit pad and the circuit path 72 providing ground connections for the circuit. Preferably a second tab portion 52.7 of the flexible substrate also extends from the first end portion 52.1 of the flexible substrate and a second circuit pad 84 is provided on that tab as well. A second capacitor 86 is mounted on the first end portion of the flexible substrate electrically connected between the circuit pad 84 and the circuit path 72 providing ground connections for the circuit 50. The tabs are located so that when the end portions of the flexible substrate are in folded relation to each other as shown in FIG. 6, the tabs extend in overlying relation to each between the rim 36.3 of the connector body and the opposite surface 12.2 of the transducer to be clamped in electrically connected relation to each other and at least one of the tabs 52.6 extends between the deformed rim 46.3 of the housing and the connector body to electrically engage the circuit pad 80 thereon with the metal housing for capacitively coupling a plurality of portions of the ground connection circuit paths of the circuit 50 to the sensor housing.

In accordance with this invention, the sensor has an opening permitting access to the circuit path pads 70 for permitting calibration of the electrical circuit 50 relative to the transducer 12 after mounting on the sensor housing 46. Preferably the connector body has an integral tubular portion 36.5 which is open at one end 36.6 outside the housing and which extends into the chamber 38 to open at its opposite end 36.7 adjacent the circuit path pads 70. The tubular portion 36.5 is indicated in FIG. 3 by the broken lines 36.5a. In that arrangement, electrical contact probes (not shown) are adapted to be inserted through the tubular portion 36.5 to engage the pads 70 for calibrating the circuit 50 in known manner. The tubular portion assures the probes do not engage other portions of the circuit 50. The probes are then withdrawn and an encapsulant 88 such as a conventional room temperature vulcanizing rubber material or the like is inserted into the tubular portion for sealing the chamber as indicated in FIG. 2, the tubular portion assuring that the encapsulant is restricted to the area of the calibrating pads 70 in the circuit 50 for avoiding deletereous effects on the circuit. If desired, the encapsulant is also deposited around the deformed rim of the housing sleeve and around the connector terminals as indicated at 90 for further sealing the chamber 38.

In that construction, the novel and improved pressure sensor of the invention provides the transducer 12 with improved reliability and consistency of transducer characteristics in an ecomonical manner. The electrical circuit 50 is adapted to be easily and reliably assembled in an economical manner outside the sensor and to be fixedly connected to the transducer and connector terminals in a reliable manner. The flexible circuit substrate has sufficient length to permit end portions of the flexible substrate to be conveniently folded over each other as described above to be received within the sleeve 46.2 of the metal housing. The rim of the housing sleeve is then easily and reliably deformed for securing the connector body and transducer in desired assembled relation to each other. Capacitors are arranged to capacitively couple a plurality of portions of a ground connection circuit paths of the circuit to the sensor housing for providing substantially improved electromagnetic compatibility in the sensor, whereby the sensor is adapted to display improved performance when used in automotive environments and the like where exposed to substantial electromagnetic interference. The circuit is adapted to be calibrated in a convenient and economical manner and is easily sealed without risk of damage to the circuit from the sealant material after calibration.

It should be understood that although particular embodiments of the invention have been described by way of illustrating the invention, the invention includes all modifications and equivalents thereof falling within the scope of the appended claims.

We claim:

1. A pressure sensor comprising a capacitive pressure transducer having a surface to be exposed to an applied pressure to provide a capacitance which varies with the applied pressure and having transducer terminals disposed at an opposite surface, a connector body having connector terminals thereon, a housing securing the connector body to the transducer in overlying relation to said opposite transducer surface for forming a chamber therebetween, and an electrical circuit disposed in the chamber electrically connected to the transducer and connector terminals for providing an electrical signal corresponding to the applied pressure, the electrical circuit including a flexible substrate having one end portion disposed in overlying relation to said opposite transducer surface mounting electrical circuit components electrically connected to the transducer terminals and having an opposite end portion folded over said one end portion mounting circuit paths thereon electrically connected to the connector terminals.

2. A pressure sensor comprising a disc shaped capacitive pressure transducer having one surface to be exposed to an applied pressure to provide a capacitance which varies with the applied pressure and having transducer terminals disposed at an opposite surface, a cup-shaped connector body of electrical insulating material having a bottom, side walls and a rim, and having connector terminals extending through the body, the connector body being disposed with the rim thereof facing said opposite transducer surface for forming a chamber therebetween, and an electrical circuit disposed in the chamber electrically connected to the transducer and connector terminals for providing an electrical signal corresponding to the applied pressure, the electrical circuit including flexible substrate having one end portion disposed in overlying relation to said opposite transducer surface mounting electrical circuit components thereon, having circuit paths disposed on said one end portion electrically connecting the circuit components to each other and to the transducer terminals, having an opposite end portion folded over said one end portion underlying the bottom of the connector body, and having circuit paths disposed on said opposite end portion electrically connecting the circuit components to the connector terminals.

3. A pressure sensor according to claim 2 wherein the housing includes a metal sleeve receiving the transducer and a portion of the connector body therein, the housing has a port therein for exposing said one transducer surface to an applied pressure, and the housing has a rim deformed over the connector body for securing the connector body and transducer together to form the chamber.

4. A pressure sensor according to claim 3 wherein circuit paths on the flexible substrate are fixedly attached to the transducer and connector terminals for securing the electrical circuit to the transducer and connector body, the flexible substrate having sufficient length to permit the substrate end portion to be disposed in folded relation to each other after said circuit paths are fixedly attached to the terminals and to permit the transducer and connector body with the attached electrical circuit to be inserted into the metal housing sleeve and clamped together by the deformed housing rim to form said chamber with the electrical circuit disposed therein.

5. A pressure sensor according to claim 2 wherein the electrical circuit has circuit paths forming electrical ground connections for the electrical circuit, the flexible substrate has a tab extending therefrom and has a circuit pad formed on the tab, a capacitor is mounted on the flexible circuit substrate electrically connected between a ground connection circuit path of the electrical circuit and said circuit pad, and the tab extends from the chamber between the connector body and the transducer to electrically connect the circuit pad to the metal housing to capacitively couple the ground connection circuit path to the metal housing for providing the sensor with electromagnetic compatibility.

6. A pressure sensor according to claim 2 wherein the electrical circuit has circuit paths forming electrical ground connections for the electrical circuit, the flexible substrate has a tab extending from each of the end portions of the flexible substrate, has a circuit pad formed on each tab, has respective capacitors mounted on the flexible substrate connected between ground connection circuit paths of the electrical circuit on each end portion of the flexible substrate and the circuit pad provided on that end portion, the flexible substrate being folded so that said circuit pads are disposed in electrically connected relation to each other and at least one of the circuit pads is electrically connected to the metal housing to capacitively couple the ground connection circuit paths to the metal housing for providing the sensor with electromagnetic compatibility.

7. A pressure sensor according to claim 2 wherein the housing includes a metal sleeve receiving the transducer and a portion of the connector body therein, the housing having a port for exposing said one transducer surface to an applied pressure and having a rim on the sleeve deformed over the connector body securing the rim of the connector body and the transducer together to form the chamber, the electrical circuit has circuit paths on the flexible substrate forming electrical ground connections for the electrical circuit, the flexible substrate has a tab portion thereof extending from each of the end portions of the flexible substrate, has a circuit pad formed on each tab portion, and has a capacitor electrically connected between ground connection circuit paths of the electrical circuit on each end portion of the flexible substrate and the circuit pad provided on the tab on that end portion, the flexible substrate being folded so that said tabs extend from the chamber between the rim of the connector body and the transducer with the circuit pads thereon clamped together in electrically connected relation to each other therebetween and with at least one of the circuit pads clamped in electrically connected relation to the metal housing sleeve by the deformed rim of the sleeve for capacitively coupling the electrical circuit to the metal housing to provide the sensor with improved electromagnetic compatibility.

8. A pressure sensor according to claim 2 wherein the electrical circuit is calibrated relative to the capacitive pressure transducer after mounting on the housing, the connector body has an integral tubular portion thereof opening at one end outside the sensor and extending into the chamber to dispose its opposite end in closely spaced relation to the electrical circuit for permitting access to a calibration portion of the electrical circuit for calibration thereof and an encapsulant fills the tubular portion of the connector body after said calibration for sealing the chamber, the tubular portion of the housing restricting said encapsulant to the calibration portion of the electrical circuit.

* * * * *